United States Patent
Fan

(10) Patent No.: US 11,870,282 B2
(45) Date of Patent: *Jan. 9, 2024

(54) CHARGING SYSTEM, METHOD, APPARATUS AND TERMINAL DEVICE

(71) Applicant: BEIJING XIAOMI MOBILE SOFTWARE CO., LTD., Beijing (CN)

(72) Inventor: Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 420 days.

This patent is subject to a terminal disclaimer.

(21) Appl. No.: 17/133,544

(22) Filed: Dec. 23, 2020

(65) Prior Publication Data
US 2021/0376620 A1 Dec. 2, 2021

(30) Foreign Application Priority Data

May 27, 2020 (CN) .......................... 202010463405.4

(51) Int. Cl.
H02J 7/00 (2006.01)

(52) U.S. Cl.
CPC .......... *H02J 7/0024* (2013.01); *H02J 7/0048* (2020.01); *H02J 2310/22* (2020.01)

(58) Field of Classification Search
USPC ................................................. 320/134–136
See application file for complete search history.

(56) References Cited

U.S. PATENT DOCUMENTS

| | | | | |
|---|---|---|---|---|
| 5,894,222 A | * | 4/1999 | Hibino | ................. G01R 31/386 324/427 |
| 8,493,031 B2 | | 7/2013 | Murao et al. | |
| 2005/0068005 A1 | | 3/2005 | Yamashita | |
| 2005/0276005 A1 | * | 12/2005 | Pantsu | ...................... G06F 1/26 361/679.27 |

(Continued)

FOREIGN PATENT DOCUMENTS

| | | |
|---|---|---|
| EP | 2207235 A1 | 7/2010 |
| EP | 2418751 A2 | 2/2012 |

(Continued)

OTHER PUBLICATIONS

Extended European Search Report in 20216693.0 dated Jun. 7, 2021.

(Continued)

*Primary Examiner* — Samuel Berhanu
(74) *Attorney, Agent, or Firm* — Syncoda LLC; Feng Ma

(57) ABSTRACT

A charging system includes: a first battery, a second battery, a switch device, a charging component, and a control component. A capacity of the second battery is smaller than that of the first battery. The switch device is disposed outside the second battery and connected to the second battery. The charging component is connected to the first battery and connected to the second battery via the switch device, and configured to output a charging current to the first battery and the second battery. The control component is connected with the first battery and the second battery, and configured to detect remaining capacity of the first battery and the (Continued)

second battery during a charging process and control the switch device to turn on or turn off based on the remaining capacity.

16 Claims, 9 Drawing Sheets

(56) References Cited

U.S. PATENT DOCUMENTS

| | | | |
|---|---|---|---|
| 2008/0191665 A1* | 8/2008 | Shao-Tsu | H02J 7/00711 |
| | | | 320/141 |
| 2011/0127830 A1* | 6/2011 | Harding | B60R 16/033 |
| | | | 307/10.7 |
| 2011/0127962 A1 | 6/2011 | Murao et al. | |
| 2012/0025744 A1 | 2/2012 | Kim et al. | |
| 2013/0015860 A1* | 1/2013 | Crombez | H01M 10/44 |
| | | | 320/137 |
| 2019/0214837 A1* | 7/2019 | Kristjansson | H02J 7/0071 |
| 2021/0237670 A1 | 8/2021 | Takahara | |

FOREIGN PATENT DOCUMENTS

| | | |
|---|---|---|
| EP | 2874271 A1 | 5/2015 |
| JP | 2018139461 A | 9/2018 |
| WO | 2012146963 A2 | 11/2012 |
| WO | 2017205466 A1 | 11/2017 |

OTHER PUBLICATIONS

Extended European Search Report in application No. 21155905.9, dated May 28, 2021.
U.S. office action in U.S. Appl. No. 17/133,548, dated Oct. 6, 2022.

* cited by examiner

CHARGING SYSTEM, METHOD, APPARATUS AND TERMINAL DEVICE

CROSS-REFERENCE TO RELATED APPLICATIONS

This application claims priority to Chinese Patent Application No. 202010463405.4 filed on May 27, 2020, the disclosure of which is hereby incorporated by reference in its entirety.

BACKGROUND

A charging system is important for a rechargeable terminal device, and is used for storing energy provided by an external power source in a battery to maintain normal use of the terminal device. Generally, in order to improve endurance of the terminal device, a large-capacity battery is used. However, the capacity of the battery affects a volume of the battery, and the larger the capacity, the larger the volume. Therefore, use of the large-capacity battery would increase difficulty of installing the charging system inside the terminal device.

SUMMARY

The present disclosure relates to the field of charging technologies, and in particular, to a charging system, method, apparatus and terminal device.

In a first aspect, some embodiments of the present disclosure provide a charging system, and the charging system includes:
 a first battery;
 a second battery having a capacity smaller than that of the first battery;
 a switch device disposed outside the second battery and connected to the second battery;
 a charging component, connected to the first battery and connected to the second battery through the switch device, and configured to output a charging current to the first battery and the second battery; and
 a control component, connected to the first battery and the second battery, and configured to detect remaining capacity of the first battery and the second battery during a charging process and control the switch device to turn on or turn off based on the remaining capacity.

In some embodiments, the control component further includes:
 a first voltammeter disposed outside the first battery, connected to the first battery, and configured to detect a cell voltage and the charging current of the first battery; and
 a processor, connected to the first voltammeter, and configured to determine the remaining capacity of the first battery based on the cell voltage and the charging current.

In some embodiments, the control component further includes: a second voltammeter.

The second voltammeter is disposed inside the second battery and connected to a cell of the second battery, and is configured to detect a cell voltage and the charging current of the second battery.

The processor is also connected to the second voltammeter, and is configured to determine the remaining capacity of the second battery based on the cell voltage and the charging current, and control the switch device to turn on or turn off based on the remaining capacity of the first battery and the second battery.

In a second aspect, some embodiments of the present disclosure provide a charging method, which is applied to the charging system described in the first aspect and includes:
 obtaining remaining capacity of a first battery and a second battery during a charging process;
 in response to the remaining capacity of the second battery increasing to a first preset threshold, controlling the switch device to disconnect the second battery from a charging component, and keeping the charging component charging the first battery; and
 in response to the remaining capacity of the first battery increasing to a second preset threshold, controlling the switch device to connect the second battery with the charging component, and keeping the charging component charging the first battery.

In some embodiments, the control component in the charging system includes a first voltammeter and a second voltammeter; the remaining capacity of the first battery and the second battery is obtained by:
 receiving a cell voltage and a charging current of the first battery obtained by the first voltammeter;
 receiving a cell voltage and a charging current of the second battery obtained by the second voltammeter; and
 determining the remaining capacity of the first battery based on the cell voltage and the charging current of the first battery, and determining the remaining capacity of the second battery based on the cell voltage and the charging current of the second battery.

In some embodiments, controlling the switch device to disconnect the second battery from a charging component specifically includes:
 outputting a disconnection signal with a low level to the switch device, where a duration of a falling edge of the disconnection signal is greater than or equal to a first set duration; or
 outputting a disconnection signal with a high level to the switch device, where a duration of a rising edge of the disconnection signal is greater than or equal to the first set duration.

In some embodiments, the first battery is kept being charged in response to the remaining capacity of the second battery increasing to a first preset threshold by:
 obtaining the charging current of the first battery in response to the remaining capacity of the second battery increasing to the first preset threshold; and
 keeping the charging component charging the first battery with the charging current within the duration of the falling edge or the rising edge.

In some embodiments, the switch device is controlled to connect the second battery with the charging component by:
 outputting a connection signal with a high level to the switch device, where a duration of a rising edge of the connection signal is greater than or equal to a second set duration; or
 outputting a connection signal with a low level to the switch device, where a duration of a falling edge of the connection signal is greater than or equal to the second set duration.

In some embodiments, the first battery is kept being charged in response to the remaining capacity of the first battery increasing to a second preset threshold by:

obtaining the charging current of the first battery in response to the remaining capacity of the first battery increasing to a second preset threshold;

keeping the charging component charging the first battery with the charging current within the duration of the rising edge or the falling edge.

In some embodiments, the terminal device further includes a prompt component configured to output remaining capacity prompt information, and before the remaining capacity of the first battery increases to the second preset threshold, the method further includes:

determining total battery power based on the remaining capacity of the first battery and the first preset threshold in response to the remaining capacity of the second battery being greater than or equal to the first preset threshold; and generating an remaining capacity prompt instruction based on the total battery power to control the prompt component to output the remaining capacity prompt information.

In a third aspect, some embodiments of the present disclosure provide a charging apparatus that is applied to the charging system described in the first aspect. The apparatus includes:

an obtaining module, configured to obtain remaining capacity of a first battery and a second battery during a charging process;

a first control module, configured to, in response to the remaining capacity of the second battery increasing to a first preset threshold, control the switch device to disconnect the second battery from a charging component, and keep the charging component charging the first battery; and a second control module, configured to, in response to the remaining capacity of the first battery increasing to a second preset threshold, control the switch device to connect the second battery with the charging component, and keep the charging component charging the first battery.

In some embodiments, the obtaining module includes:

a first receiving unit, configured to receive a cell voltage and a charging current of the first battery obtained by the first voltammeter;

a second receiving unit, configured to receive a cell voltage and a charging current of the second battery obtained by the second voltammeter; and a determining unit, configured to determine the remaining capacity of the first battery based on the cell voltage and the charging current of the first battery, and determine the remaining capacity of the second battery based on the cell voltage and the charging current of the second battery.

In some embodiments, the first control module includes a first control unit configured to:

output a disconnection signal with a low level to the switch device, where a duration of a falling edge of the disconnection signal is greater than or equal to a first set duration; or output a disconnection signal with a high level to the switch device, where a duration of a rising edge of the disconnection signal is greater than or equal to the first set duration.

In some embodiments, the first control module further includes:

a first obtaining unit, configured to obtain the charging current of the first battery in response to the remaining capacity of the second battery increasing to the first preset threshold; and a first charging unit, configured to keep the charging component charging the first battery with the charging current within the duration of the falling edge or the rising edge.

In some embodiments, the second control module includes: a second control unit configured to:

output a connection signal with a high level to the switch device, where a duration of a rising edge of the connection signal is greater than or equal to a second set duration; or output a connection signal with a low level to the switch device, where a duration of a falling edge of the connection signal is greater than or equal to the second set duration.

In some embodiments, the second control module further includes:

a second obtaining unit, configured to obtain the charging current of the first battery in response to the remaining capacity of the first battery increasing to a second preset threshold; and a second charging unit, configured to keep the charging component charging the first battery with the charging current within the duration of the rising edge or the falling edge.

In some embodiments, the terminal device further includes a prompt component configured to output remaining capacity prompt information, and the apparatus further includes:

a determining module, configured to determine total battery power based on the remaining capacity of the first battery and the first preset threshold in response to the remaining capacity of the second battery being greater than or equal to the first preset threshold; and an instruction generation module, configured to generate an remaining capacity prompt instruction based on the total battery power to control the prompt component to output the remaining capacity prompt information.

In a fourth aspect, some embodiments of the present disclosure provide a terminal device, the terminal device including:

a charging system, as provided in the first aspect;
a memory storing processor executable instruction; and
a processor, configured to execute the executable instructions in the memory to implement the method as provided in the second aspect.

In a fifth aspect, some embodiments of the present disclosure provide a readable storage medium having executable instructions stored thereon, and the executable instructions, when executed by a processor, implement the steps of the charging method provided in the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in the specification and constitute a part of the disclosure, show some embodiments of the present disclosure. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present disclosure. Instead, they are merely examples of devices and methods consistent with aspects of the present disclosure as detailed in the appended claims.

The terms used in the present disclosure are merely for the purpose of describing particular embodiments and are not intended to limit the present disclosure. Unless otherwise defined, technical terms or scientific terms used in the present disclosure shall have the usual meanings understood by those with ordinary skills in the art to which the present disclosure belongs. Similar words such as "a" or "one" used in the specification and the claims of the present disclosure do not mean a quantity limitation, but mean that there is at least one element. Unless otherwise indicated, "including" or "containing" and other similar words mean that an element or item before "including" or "containing" covers elements or items and their equivalents listed after "including" or "containing" without excluding other elements or items. "Connected" or "coupled" and other similar words are not limited to physical or mechanical connections, and can include electrical connections, whether direct or indirect. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

Figure 1:
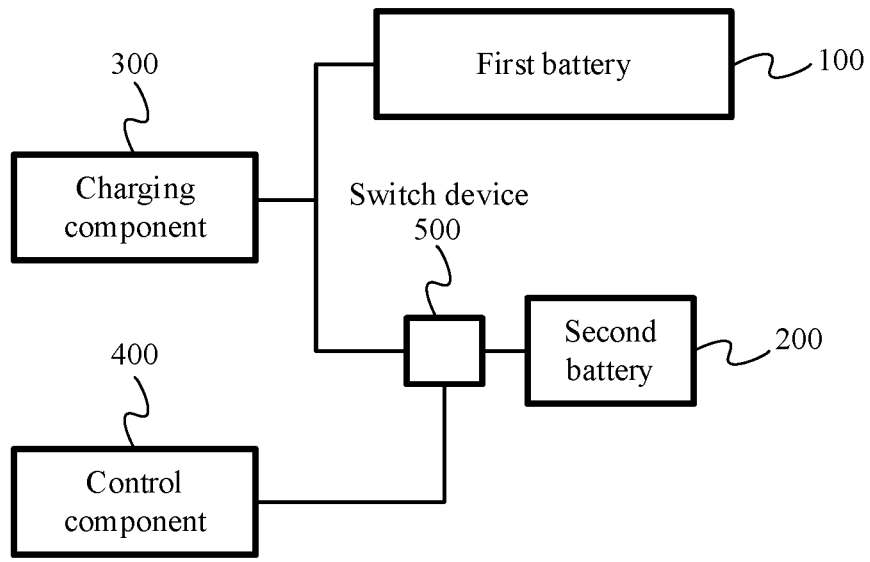
FIG. 1 is a schematic structural diagram showing a charging system according to some embodiments.

FIG. 1 is a schematic structural diagram showing a charging system according to some embodiments. As shown in FIG. 1, the charging system provided by the some embodiments of the present disclosure includes: a first battery 100, a second battery 200, a charging component 300, a control component 400 and a switch device 500.

The first battery 100 and the second battery 200 are disposed in parallel. A total capacity of the charging system is a sum of capacities of the first battery 100 and the second battery 200. Also, the capacity of the second battery 200 is smaller than that of the first battery 100, and a volume of the second battery 200 is smaller than that of the first battery 100.

In a case where the total capacity of the battery is the same, compared with a method of using one battery in the related art, the volume of the first battery 100 and the volume of the second battery 200 are reduced in the some embodiments of the present disclosure. In addition, the volume of the first battery 100 is greater than that of the second battery 200, so that the second battery 200 can be installed in a relatively small space in the terminal device, such as corner space. In this way, on the premise of meeting the requirements of the terminal device for the battery capacity, the difficulty of installing the charging module is further reduced.

For two batteries with different capacities and disposed in parallel, power consumption rates of the two batteries in a charging state are similar. Therefore, the two batteries need to be supplemented with different amounts of electricity when being charged. In this case, the battery with a smaller capacity will be fully charged first. At this time, if no control is performed, it may cause that the battery with the smaller capacity is overcharged in the charging process of the battery with a larger capacity. Accordingly, aging of the battery with the smaller capacity is accelerated, and it may even cause a battery swelling, which is a safety hazard.

Based on the above conditions, in the some embodiments of the present disclosure, the switch device 500 is provided outside the second battery 200, and the switch device 500 is connected to the second battery 200.

The charging component 300 is connected to the first battery 100. The charging component 300 is connected to positive and negative electrodes of a cell of the first battery 100, and is configured to convert a current output by an external power source into a current suitable for the first battery 100 to charge the first battery 100.

The charging component 300 is connected to the second battery 200 via the switch device 500. The charging component 300 is directly connected to a negative electrode of a cell of the second battery 200. The switch device 500 is connected to a positive electrode of the second battery 200, and the charging component 300 is connected to the positive electrode of the cell of the second battery 200 via the switch device 500. When the switch device 500 is turned on, the charging component 300 converts the current output by the external power source into a current suitable for the second battery 200 to charge the second battery 200.

In addition, the charging component 300 includes at least one charge pump chip. In a case that the charging component 300 includes multiple charge pump chips, the multiple charge pump chips are disposed in parallel to reduce a current in each charge pump chip and reduce the heating caused by charging.

The control component 400 is connected to the cells of the first battery 100 and the second battery 200, and is configured to detect remaining capacity of the first battery 100 and the second battery 200 during a charging process and control the switch device 500 to turn on or turn off based on the detected remaining capacity of the first battery 100 and the second battery 200.

In this way, when it is detected that the remaining capacity of the second battery 200 is greater than a set threshold (for example, when the second battery 200 is charged fully), the control component 400 can control the switch device 500 to turn off, that is, the charging component 300 and the second battery 200 is disconnected. In this way, the second battery 200 with the smaller capacity is effectively avoided to be overcharged, and the safety of the charging system is ensured.

Figure 2:
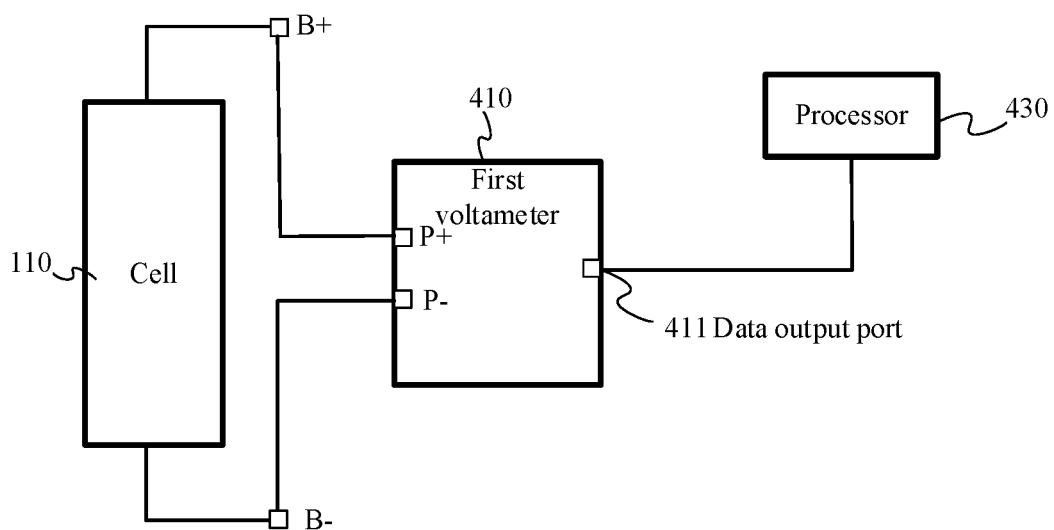
FIG. 2 is a schematic diagram showing a partial structure of a charging system according to some embodiments.
Figure 3:
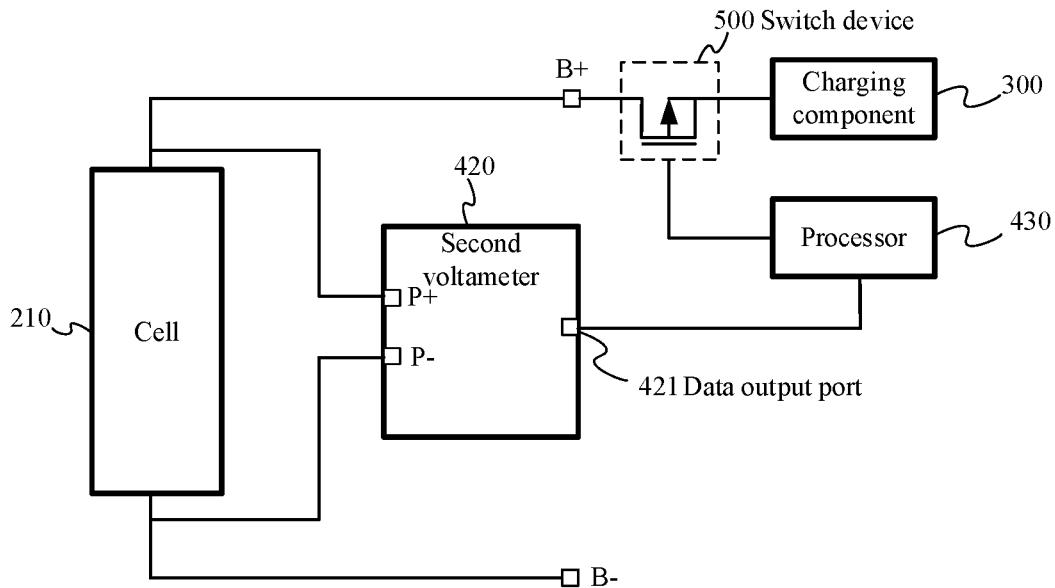
FIG. 3 is a schematic diagram showing a partial structure of a charging system according to some embodiments.

FIGS. 2 and 3 are schematic diagrams showing partial structures of charging systems according to some other embodiments.

In some embodiments, with reference to FIGS. 2 and 3, the control component 400 (not indicated in the figures) includes: a first voltammeter 410, a second voltammeter 420 and a processor 430.

The first voltammeter 410 is configured to detect a cell voltage and the charging current of the first battery 100. The second voltammeter 420 is configured to detect a cell voltage and the charging current of the second battery 200. The processor 430 is connected to the first voltammeter 410 and the second voltammeter 420, and is configured to determine the remaining capacity of the first battery 100 and the second battery 200 based on the cell voltage and the charging current, and to control the switch device 500 to turn on or turn off based on the remaining capacity.

Specifically, as shown in FIG. 2, the first voltammeter 410 is disposed outside the first battery 100. In some embodiments, the first voltammeter 410 is a voltammeter cooperated with the charging component 300.

Since a situation where the second battery 200 is not fully charged while the first battery 100 is overcharged will not occur during use of the charging system, the first battery 100 can be continuously charged. Based on this, by arranging the first voltammeter 410 outside the first battery 100, the detected cell voltage and the charging current can meet the requirements for detecting the remaining capacity of the first battery 100. In addition, by arranging the first voltammeter 410 outside the first battery, the volume of the first battery can be reduced, thereby further reducing the difficulty of installing the first battery in the terminal device.

The first battery 100 includes a positive charging port B+ and a negative charging port B−. The positive charging port B+ is connected to the positive electrode of the cell 110 of the first battery 100, and the negative charging port B− is connected to the negative electrode of the cell 110 of the first battery 100.

The first voltammeter 410 includes a positive connection port P+ and a negative connection port P−. The positive connection port P+ is connected to the positive charging port B+, and the negative connection port P− is connected to the negative charging port B−. In this way, the first voltammeter 410 can obtain the cell voltage of the first battery 100 and the charging current received by the cell. The positive charging port B+ and the negative charging port B− are also connected to the charging component 300 to receive the current output by the charging component 300.

The first voltammeter 410 further includes a data output port 411. The data output port 411 is connected to the processor 430 and is configured to send the obtained cell voltage and the charging current of the first battery 100 to the processor 430. Furthermore, the processor 430 obtains, based on the cell voltage and the charging current of the first battery 100, the remaining capacity corresponding to the current cell voltage and the charging current according to a pre-built model. Accordingly, real-time monitoring of the remaining capacity of the first battery 100 is achieved by the control component 400.

In some embodiments, the positive charging port B+ of the first battery is connected to the positive electrode of the cell via a switch device. The switch device may be a metal oxide semiconductor (MOS) field effect transistor. The processor 430 is connected to the switch device to control the switch device to turn on and turn off. The processor 430 controls the switch element to disconnect the positive electrode of the cell from the positive charging port B+ under a set condition (for example, upon receiving a fault signal triggered by a circuit fault), so as to realize a function of circuit protection.

As shown in FIG. 3, the second voltammeter 420 is disposed inside the second battery 200, for example, on a protection circuit module of the second battery 200. It should be noted that when the charging system is used, in order to prevent the second battery 200 from being overcharged, the second voltammeter 420 is disposed inside the second battery 200 and is directly connected to the cell 210 of the second battery 200. As a result, the detecting accuracy of the cell voltage and the charging current is improved, thereby assisting the processor 430 to accurately control the switch device 500 to turn on or turn off based on the remaining capacity of the second battery 200.

The second voltammeter 420 includes a positive connection port P+ and a negative connection port P−. In the second battery 200, the positive connection port P+ is connected to the positive electrode of the cell 210, and the negative connection port P− is connected to the negative electrode of the cell 210. In this way, the second voltammeter 420 directly obtains the cell voltage of the second battery 200 and the charging current received by the cell 210.

The second voltammeter 420 further includes a data output port 421. The data output port 421 is connected to the processor 430, and is configured to send the obtained cell voltage and charging current of the second battery 200 to the processor 430. Furthermore, the processor 430 obtains, based on the cell voltage and charging current of the second battery 200, the remaining capacity corresponding to the current cell voltage and charging current according to a pre-built model. Accordingly, real-time monitoring of the remaining capacity of the second battery 200 is achieved by the control component 400.

In addition, the switch device 500 is connected to the positive charging port B+ of the second battery 200 and the charging component 300. When the switch device 500 is turned on, the cell 210 of the second battery 200 receives the current output by the charging component 300.

In some embodiments, the switch device 500 is a MOS transistor with a drain, a gate and a source. A drain and a source of the switch device 500 is connected to the positive charging port B+, the other of the drain and source is connected to the charging component 300, and the gate is connected to the processor 430. During charging, the source and drain are connected, so that the positive charging port B+ can receive the current output by the charging component 300. The processor 430 sends a turn-off signal to the gate to disconnect the source from the drain, so that the positive charging port B+ cannot receive the current output by the charging component 300.

Moreover, by disposing the switch device 500 outside the second battery 200, the volume of the second battery 200 can be further reduced, thereby reducing the difficulty of installing the second battery 200 in the terminal device.

Figure 4:
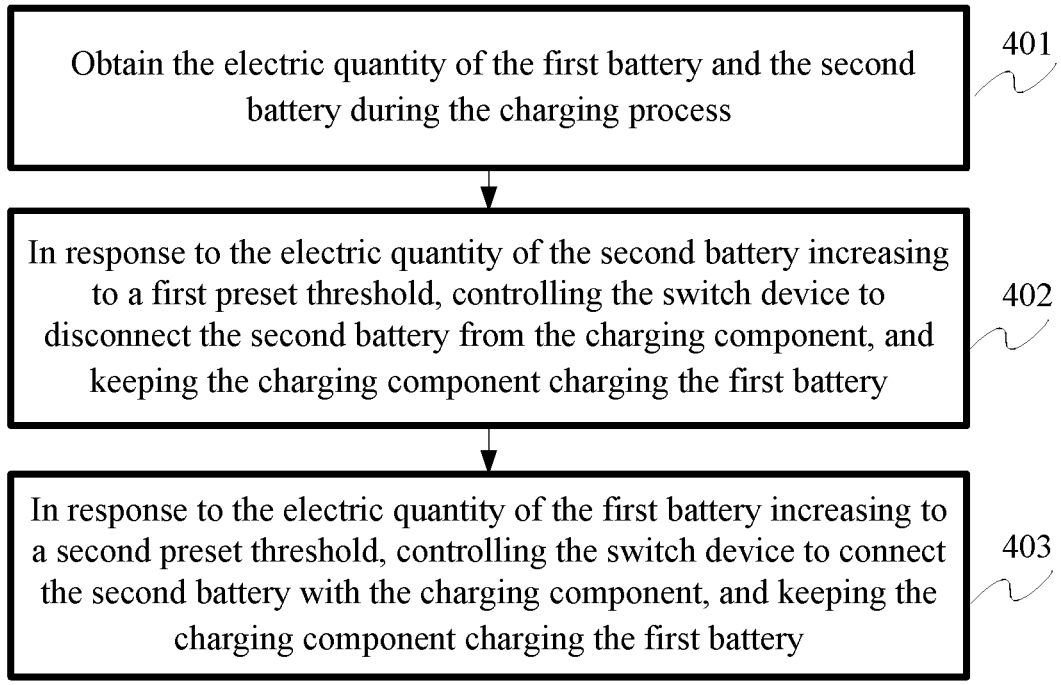
FIG. 4 is a first flowchart showing charging methods according to some embodiments.

Based on the charging system provided above, some embodiments of the present disclosure provide a charging method. FIG. 4 is a flowchart showing a charging method according to some embodiments. As shown in FIG. 4, the charging method includes steps described below.

In step 401, remaining capacity of a first battery and a second battery is obtained during a charging process.

In step 401, the switch device of the second battery is turned on, so that the second battery receives the current output by the charging component.

Figure 5:
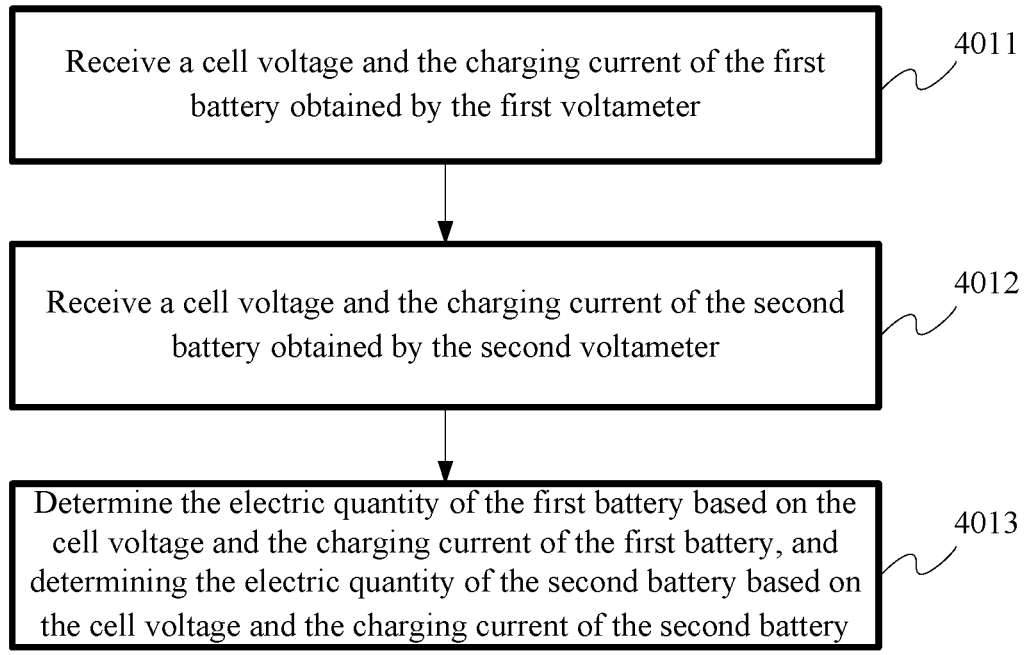
FIG. 5 is a second flowchart showing charging methods according to some other embodiments.

In some embodiments, the control component in the charging system includes a first voltammeter and a second voltammeter. FIG. 5 is a partial flowchart showing a charging method according to some embodiments. As shown in FIG. 5, step 401 includes steps 4011-4013.

In step 4011, a cell voltage and a charging current of the first battery obtained by the first voltammeter are received.

With reference to FIG. 2, the positive connection port P+ of the first voltammeter is connected to the positive charging port B+ of the first battery, and the negative connection port P− is connected to the negative charging port B− of the first battery, so as to obtain the cell voltage and charging current of the first battery.

In step 4012, a cell voltage and a charging current of the second battery obtained by the second voltammeter are received.

With reference to FIG. 3, the positive connection port P+ of the second voltammeter is directly connected to the positive electrode of the cell of the second battery, and the negative connection port P− is directly connected to the negative electrode of the cell of the second battery, so as to obtain the cell voltage and charging current of the second battery.

It should be noted that the order of step 4011 and step 4012 is not specifically limited. For example, step 4012 is executed first, and then step 4011 is executed. Alternatively, step 4011 and step 4012 are executed simultaneously.

In step 4013, the remaining capacity of the first battery is determined based on the cell voltage and the charging current of the first battery, and the remaining capacity of the second battery is determined based on the cell voltage and the charging current of the second battery.

In some embodiments, a corresponding relationship between the charging current, the cell voltage and the remaining capacity is built in advance according to the performance of the first battery and the second battery. In step 4013, based on the charging current and the cell voltage, the remaining capacity is obtained according to the pre-stored corresponding relationship.

Continuing to refer to FIG. 4, step 402 is executed after step 401.

In step 402, in response to the remaining capacity of the second battery increasing to a first preset threshold, the switch device is controlled to disconnect the second battery from a charging component, and the first battery is kept being charged by the charging component.

As the charging process progresses, the remaining capacity of the second battery is close to saturation first. In some embodiments, the first preset threshold is selected as 95% to 98% of the capacity of the second battery. In other words, when the remaining capacity of the second battery increases to the first preset threshold, the second battery is substantially fully charged. At this time, the second battery is disconnected from the charging component by controlling the switch device to suspend the charging of the second battery, and the charging component only charges the first battery.

In this way, the charging of the second battery is suspended when the remaining capacity of the second battery is close to saturation. Accordingly, it not only continues to charge the first battery, and also avoid overcharging the second battery. Moreover, when the capacity of the second battery reaches the first preset threshold, the large battery is not close to saturation. At this time, the charging current of the first battery is large, causing the line where the first battery and the second battery are connected to generate heat. If the charging of the second battery is suspended after the second battery reaches saturation, the line of the second battery may generate excessive heat, resulting in problems such as a swelling and accelerated aging caused by overcharging. Therefore, when the remaining capacity of the second battery reaches the first set threshold close to saturation, charging is suspended to ensure the safety of the second battery.

Based on different types of the switch device, the ways to control the switch to turn off are different, which are specifically described in combination with different examples.

For example, the switch device is an N-channel MOS transistor. The source and drain are connected when the gate receives a high-level signal, and the source and drain are disconnected when the gate receives a low-level signal.

In this case, in step 401, the switch device is turned on by applying a high-level signal to the gate of the switch device. Moreover, in step 402, the switch device is controlled to disconnect the second battery from the charging component by applying a disconnection signal with a low level to the switch device.

A duration of a falling edge of the disconnection signal is greater than or equal to a first set duration. In some embodiments, the first set duration is 2 milliseconds. In this way, due to the disconnection signal, the current flowing through the switch device is gradually reduced. In addition, in order to ensure the response rate of the switch device, the duration of the falling edge is less than or equal to a third set duration. In some embodiments, the first set duration is 2 milliseconds, and the third set duration is 4 milliseconds. In this case, the duration of the falling edge of the disconnection signal is 2 milliseconds, 2.5 milliseconds, 3 milliseconds, and so on.

Figure 6:
FIG. 6 is a comparison diagram showing a relationship between a driving signal of a switch device and a battery charging current according to some embodiments.
Figure 6:
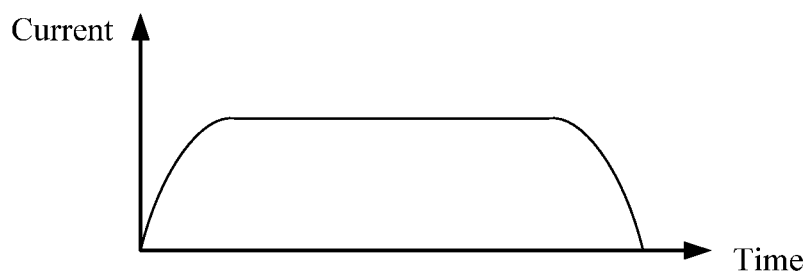

FIG. 6 is a diagram showing a corresponding relationship between a driving signal of the switch device and the current of the second battery according to some embodiments. As shown on a right side of FIG. 6, as the voltage value of the disconnection signal gradually decreases, the value of the current through the switch device slowly decreases.

By disconnecting the second battery from the charging component through the switch device, a parallel branch in the charging system is reduced. In addition, the duration of the falling edge of the disconnection signal is controlled so that the charging current of the second battery is slowly reduced. As a result, the overall charging system can gradually adapt to the changes in the parallel branches of the charging system to avoid system current fluctuations caused by the sudden change in the charging current of the second battery, and to ensure the safety of the device. In addition, in this way, the remaining capacity information (for example, the remaining capacity value) displayed in the terminal device is also in a stable state, avoiding jumps in the remaining capacity information, and optimizing user experience.

For example, the switch device is a P-channel MOS transistor, the source and drain are connected when the gate receives the low-level signal, and the source and drain are disconnected when the gate receives the high-level signal.

In this case, in step 401, the switch device is turned on by applying the low-level signal to the gate of the switch device. In addition, in step 402, the switch device is controlled to disconnect the second battery from the charging component by applying a disconnection signal with a high level to the switch device, and the duration of the rising edge of the disconnection signal is greater than or equal to the first set duration.

Similarly, the duration of the rising edge of the disconnection signal is greater than or equal to the first set duration, so that the current through the switch device gradually increases. In addition, the duration of the rising edge is less than or equal to the third set duration to ensure the response rate of the switch device. In some embodiments, the first set duration is 2 milliseconds, and the third set duration is 4 milliseconds. In this case, the duration of the rising edge of the disconnection signal is 2 milliseconds, 2.5 milliseconds, 3 milliseconds, and so on.

In this way, by controlling the duration of the falling edge of the disconnection signal, the charging current of the second battery is slowly reduced. As a result, the overall charging system can gradually adapt to the changes in the parallel branches to avoid system current fluctuations caused by the sudden change in the charging current of the second battery, and to ensure the safety of the device.

Figure 7:
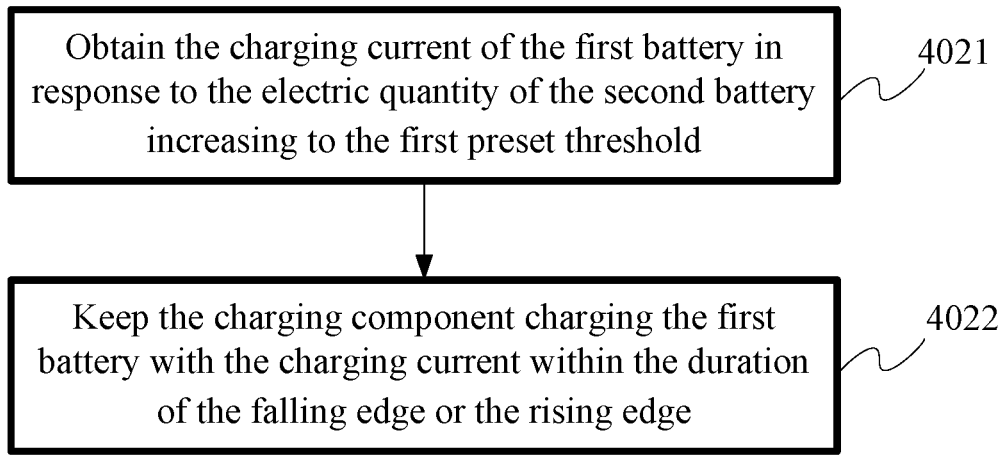
FIG. 7 is a first flowchart showing charging methods according to some embodiments.

FIG. 7 is a partial flowchart showing a charging method according to some embodiments. In some embodiments, as shown in FIG. 7, step 402 of continuing to charge the first battery specifically includes steps 4021 to 4022.

In step 4021, in response to the remaining capacity of the second battery increasing to the first preset threshold, the charging current of the first battery is obtained.

In step 4022, within the duration of the falling edge (when the switch device is the N-channel MOS transistor) or the rising edge (when the switch device is the P-channel MOS transistor), the first battery is kept being charged by the charging component with the charging current.

By step 4021 and step 4022, the charging current of the first battery is kept stable during the process that the switch device is changed from an on state to an off state. In this way, the current of the charging system is maintained stable, and the remaining capacity information displayed by the terminal device is also in a stable state, avoiding the jump of remaining capacity information, and optimizing the user experience.

Continuing to refer to FIG. 4, step 403 is executed after step 402.

In step 403, in response to the remaining capacity of the first battery increasing to a second preset threshold, the switch device is controlled to connect the second battery with the charging component, and the first battery is kept being charged by the charging component.

After the charging of the second battery is suspended in step 402, the charging component continues to charge the first battery. As the charging progresses, the remaining capacity of the first battery gradually increases. In step 403, when the remaining capacity of the first battery increases to the second preset threshold, the capacity of the first battery is also close to saturation. In some embodiments, the second preset threshold is selected as 95% to 98% of the capacity of the first battery. In this case, by controlling the switch element to turn on, the second battery that is close to saturation is charged again. In this way, the first battery and the second battery are charged simultaneously until they are saturated.

In this way, during the overall charging process, it avoids overcharging the second battery with the small capacity, and the use safety of the charging system and the device safety are optimized.

Similar to step 402, in step 403, the ways of controlling the switch device to turn on are different depending on different types of the switch devices, which are specifically described below in combination with specific examples.

For example, the switch device is an N-channel MOS transistor. In this case, the switch device is controlled to turn on in step 403 by applying a connection signal with a high level to the switch device. In addition, the duration of the rising edge of the connection signal is greater than or equal to a second set duration; the duration of the rising edge of the connection signal is less than or equal to a fourth set duration.

For example, the switch device is a P-channel MOS transistor. In this case, the switch device is controlled to turn on in step 403 by applying a connection signal with a low level to the switch device. Moreover, the duration of the falling edge of the connection signal is greater than or equal to the second set duration; the duration of the falling edge of the connection signal is less than or equal to the fourth set duration.

In the above two examples, the second set duration is 2 milliseconds, and the fourth set duration is 4 milliseconds. In this way, the switch device is slowly turned on, so that the current through the switch device rises slowly, and the switch device is guaranteed to have a faster response rate.

Figure 8:
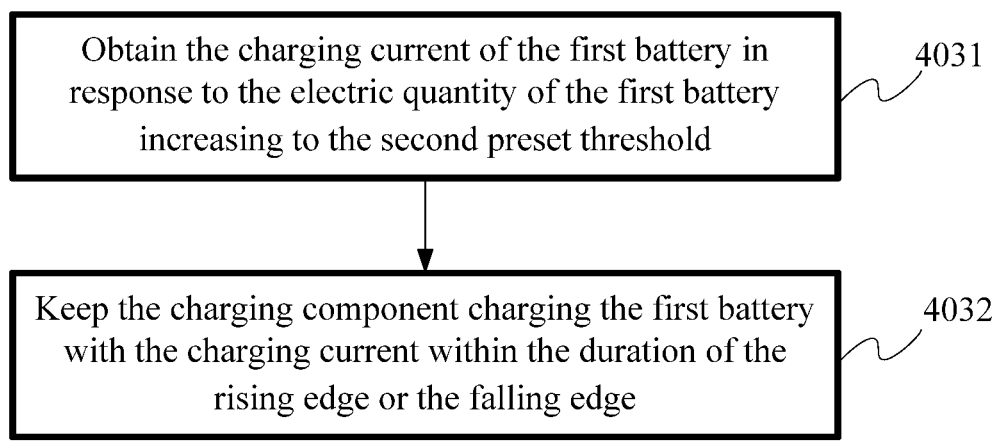
FIG. 8 is a second flowchart showing charging methods according to some other embodiments.

FIG. 8 is a partial flowchart showing a charging method according to some embodiments. In some embodiments, as shown in FIG. 8, the first battery is kept being charged in step 403 through steps 4031 to 4032.

In step 4031, the charging current of the first battery is obtained in response to the remaining capacity of the first battery increasing to a second preset threshold;

In step 4032, within the duration of the rising edge or the falling edge, the first battery is kept being charged by the charging component with the charging current.

By step 4031 and step 4032, the charging current of the first battery is kept stable during the process that the switch device is changed from the off state to the on state. In this way, the current of the charging system is maintained stable, and the remaining capacity information displayed by the terminal device is also in the stable state, avoiding the jump of remaining capacity information, and optimizing the user experience.

In addition, the remaining capacity of the first battery and the second battery are both close to saturation in step 403, and the charging current at this time is very small. Therefore, the charging method further includes: in response to the charging current of the first battery and the second battery reaching a cut-off current, controlling an external charger to stop charging the first battery and the second battery. As such, the overall charging process is completed, and the overshoot of the first battery and the second battery is avoided by adjusting the cut-off current to ensure battery safety.

Figure 9:
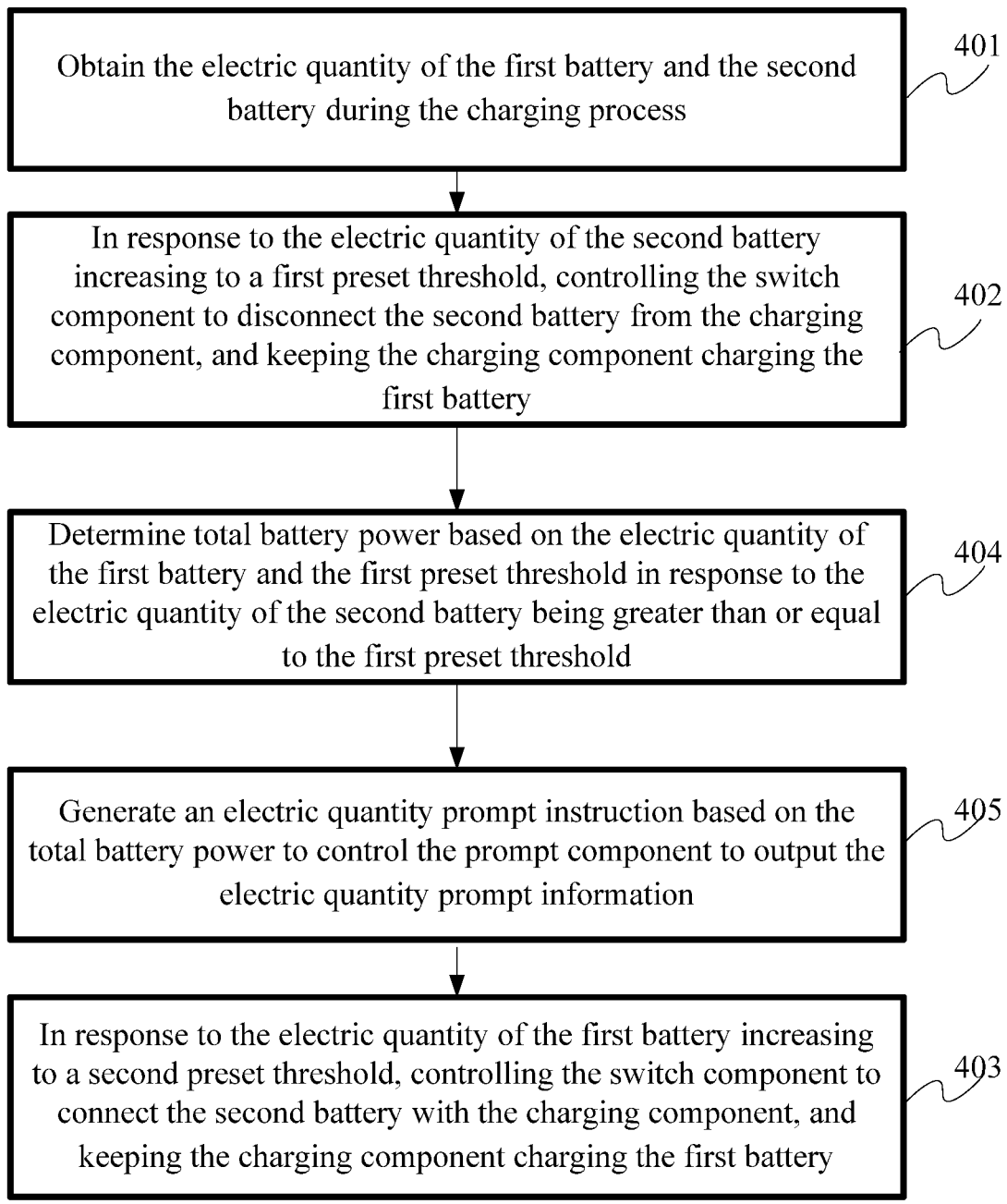
FIG. 9 is a third flowchart showing charging methods according to some other embodiments.

In some embodiments, the terminal device further includes a prompt component configured to output remaining capacity prompt information. FIG. 9 is a flowchart showing a charging method according to some embodiments. As shown in FIG. 9, the method further includes steps 404 and 405 before the remaining capacity of the first battery increases to the second preset threshold in step 403.

In step 404, in response to the remaining capacity of the second battery being greater than or equal to the first preset threshold, total battery power is determined based on the remaining capacity of the first battery and the first preset threshold.

During the charging process, in a process in which the switch device is changed from off to on again, the total battery power of the charging system is determined based on the remaining capacity of the first battery and the first preset threshold. In some embodiments, the total battery power is determined by summing the remaining capacity of the first battery and the first preset threshold; or, the total battery power is determined by performing a weighted summation on the first battery power and the first preset threshold.

In step 405, an remaining capacity prompt instruction is generated based on the total battery power so that the prompt component outputs the remaining capacity prompt information.

In some embodiments, the prompt component is a display screen, and the output prompt information is visual prompt information (for example, text, numbers, or images). In some embodiments, the prompt component is a vibration motor, and the output prompt information is vibration tactile information. In some embodiments, the prompt component is a speaker, and the output prompt information is voice information.

In summary, the charging method provided by the some embodiments of the present disclosure monitors the remaining capacity of the first battery and the second battery in real time, so as to determine the charging progress of the first battery and the second battery.

According to the charging progress of the first battery and the second battery, when the remaining capacity of the second battery with a small capacity increases to the first preset threshold, the switch device is controlled to disconnect the second battery from the charging component, that is, the charging of the second battery is suspended. At this time, the first battery with a large capacity is continued to be charged.

When the remaining capacity of the first battery increases to the second preset threshold value, the switch device is controlled to connect the second battery with the charging component again, that is, the second battery is recharged. At this time, the charging component is controlled to charge the first battery and the second battery simultaneously. And since the remaining capacity of the two batteries is close to saturation, the charging current is close to the cut-off current during recharging. When the charging current of the first battery and the second battery reaches the cut-off current, the charging process is completed.

The charging method provided by the some embodiments of the present disclosure provides a charging scheme for the first battery and the second battery with different capacities. In addition, during the overall charging process, it avoids overcharging the second battery with the small capacity to ensure the device safety and use safety of the overall charging system. Furthermore, it is supported to install the first battery and the second battery of different sizes in the terminal device, and on the premise of realizing a larger battery capacity, the installing difficulty of the charging system is reduced.

Figure 10:
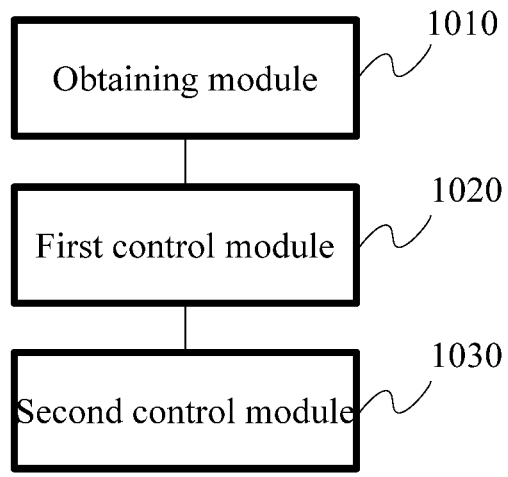
FIG. 10 is a first block diagram showing charging apparatuses according to some embodiments.

Based on the charging method provided above, some embodiments of the present disclosure further provide a charging control apparatus. FIG. 10 is a block diagram showing a charging apparatus according to some embodiments. As shown in FIG. 10, the charging apparatus includes: an obtaining module 1010, a first control module 1020, and a second control module 1030.

The obtaining module 1010 is configured to obtain remaining capacity of a first battery and a second battery during a charging process.

The first control module 1020 is configured to, in response to the remaining capacity of the second battery increasing to a first preset threshold, control a switch device to disconnect the second battery from a charging component, and control the charging component to continue charge the first battery.

The second control module 1030 is configured to, in response to the remaining capacity of the first battery increasing to a second preset threshold, control the switch device to connect the second battery with the charging component, and control the charging component to continue charge the first battery.

Figure 11:
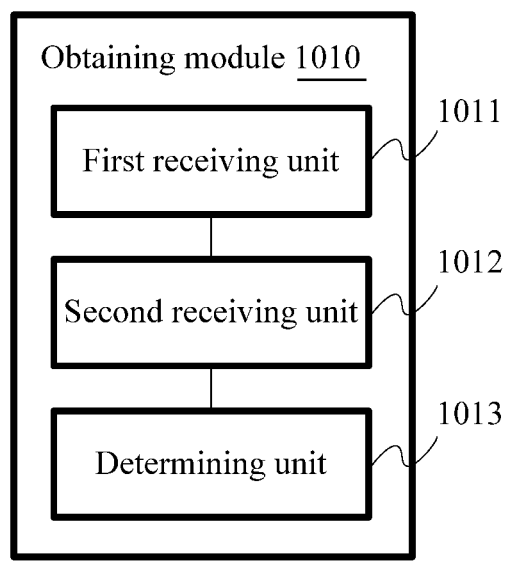
FIG. 11 is a second block diagram showing charging apparatuses according to some other embodiments.

In some embodiments, FIG. 11 is a block diagram showing a charging apparatus according to some embodiments. As shown in FIG. 11, the obtaining module 1010 includes: a first receiving unit 1011, a second receiving unit 1012, and a determining unit 1013.

The first receiving unit 1011 is configured to receive the cell voltage and the charging current of the first battery obtained by the first voltammeter.

The second receiving unit 1012 is configured to receive the cell voltage and the charging current of the second battery obtained by the second voltammeter.

The determining unit 1013 is configured to determine the remaining capacity of the first battery based on the cell voltage and the charging current of the first battery, and determine the remaining capacity of the second battery based on the cell voltage and the charging current of the second battery.

Figure 12:
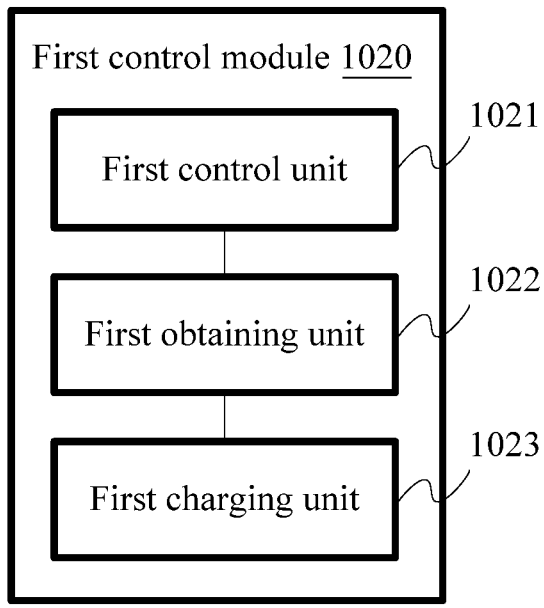
FIG. 12 is a third block diagram showing charging apparatuses according to some other embodiments.

In some embodiments, FIG. 12 is a block diagram showing a charging apparatus according to some embodiments. As shown in FIG. 12, the first control module 1020 includes a first control unit 1021.

The first control unit 1021 is configured to output a disconnection signal with a low level to the switch device, where a duration of a falling edge of the disconnection signal is greater than or equal to a first set duration.

Alternatively, the first control unit 1021 is configured to: output a disconnection signal with a high level to the switch device, where a duration of a rising edge of the disconnection signal is greater than or equal to the first set duration.

As shown in FIG. 12, the first control module 1020 further includes: a first obtaining unit 1022 and a first charging unit 1023.

The first obtaining unit 1022 is configured to obtain the charging current of the first battery in response to the remaining capacity of the second battery increasing to the first preset threshold.

The first charging unit 1023 is configured to keep the charging component to charge the first battery with the charging current within the duration of the falling edge or the rising edge.

Figure 13:
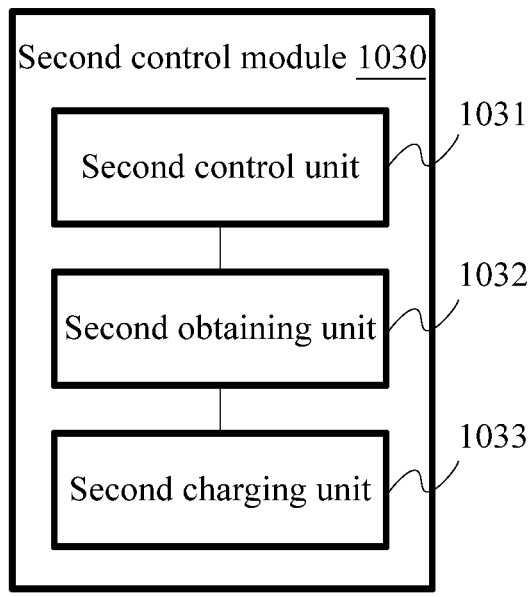
FIG. 13 is a fourth block diagram showing charging apparatuses according to some other embodiments.

In some embodiments, FIG. 13 is a block diagram showing a charging apparatus according to some embodiments. As shown in FIG. 13, the second control module 1030 includes a second control unit 1031.

The second control unit 1031 is configured to output a connection signal with a high level to the switch device, where a duration of a rising edge of the connection signal is greater than or equal to a second set duration.

Alternatively, the second control unit 1031 is configured to output a connection signal with a low level to the switch device, where a duration of a falling edge of the connection signal is greater than or equal to the second set duration.

The second control module 1030 further includes: a second obtaining unit 1032 and a second charging unit 1033.

The second obtaining unit 1032 is configured to obtain the charging current of the first battery in response to the remaining capacity of the first battery increasing to a second preset threshold.

The second charging unit 1033 is configured to keep the charging component to charge the first battery with the charging current within the duration of the rising edge or the falling edge.

Figure 14:
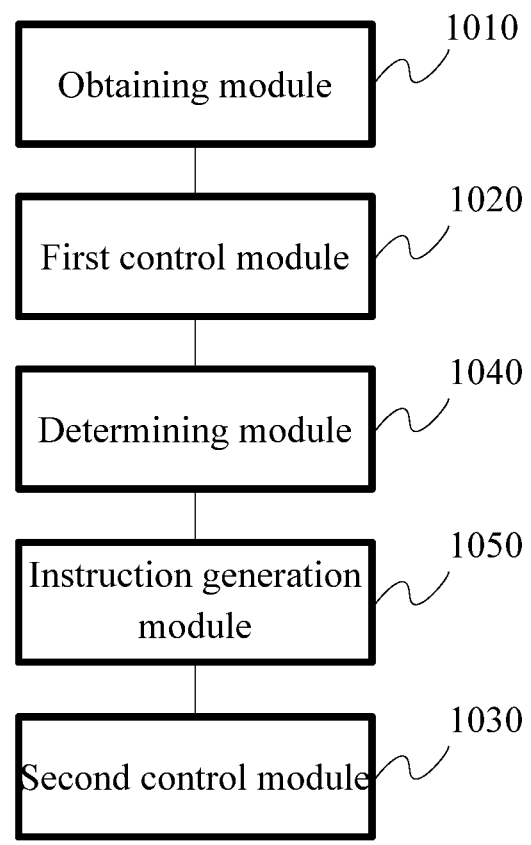
FIG. 14 is a fifth block diagram showing charging apparatuses according to some other embodiments.

In some embodiments, FIG. 14 is a block diagram showing a charging apparatus according to some embodiments. The terminal device further includes a prompt component configured to output remaining capacity prompt information. As shown in FIG. 14, the apparatus further includes: a determining module 1040 and an instruction generation module 1050.

The determining module 1040 is configured to: before the remaining capacity of the first battery increasing to the second preset threshold, determine total battery power based on the remaining capacity of the first battery and the first preset threshold in response to the remaining capacity of the second battery being greater than or equal to the first preset threshold.

The instruction generation module 1050 is configured to generate an remaining capacity prompt instruction based on the total battery power so that the prompt component outputs the remaining capacity prompt information.

Based on the charging system, charging method, and apparatus provided above, the some embodiments of the present disclosure further provide a terminal device. In some embodiments, the terminal device is a mobile phone, a tablet computer, a smart wearable device (a smart bracelet, a smart watch), a vehicle-mounted device, a medical device, etc.

The terminal device includes a memory, a processor, and the charging system provided above. The memory stores executable instructions of the processor, and the processor is configured to execute the executable instructions in the memory to implement the steps of the charging method provided above.

Figure 15:
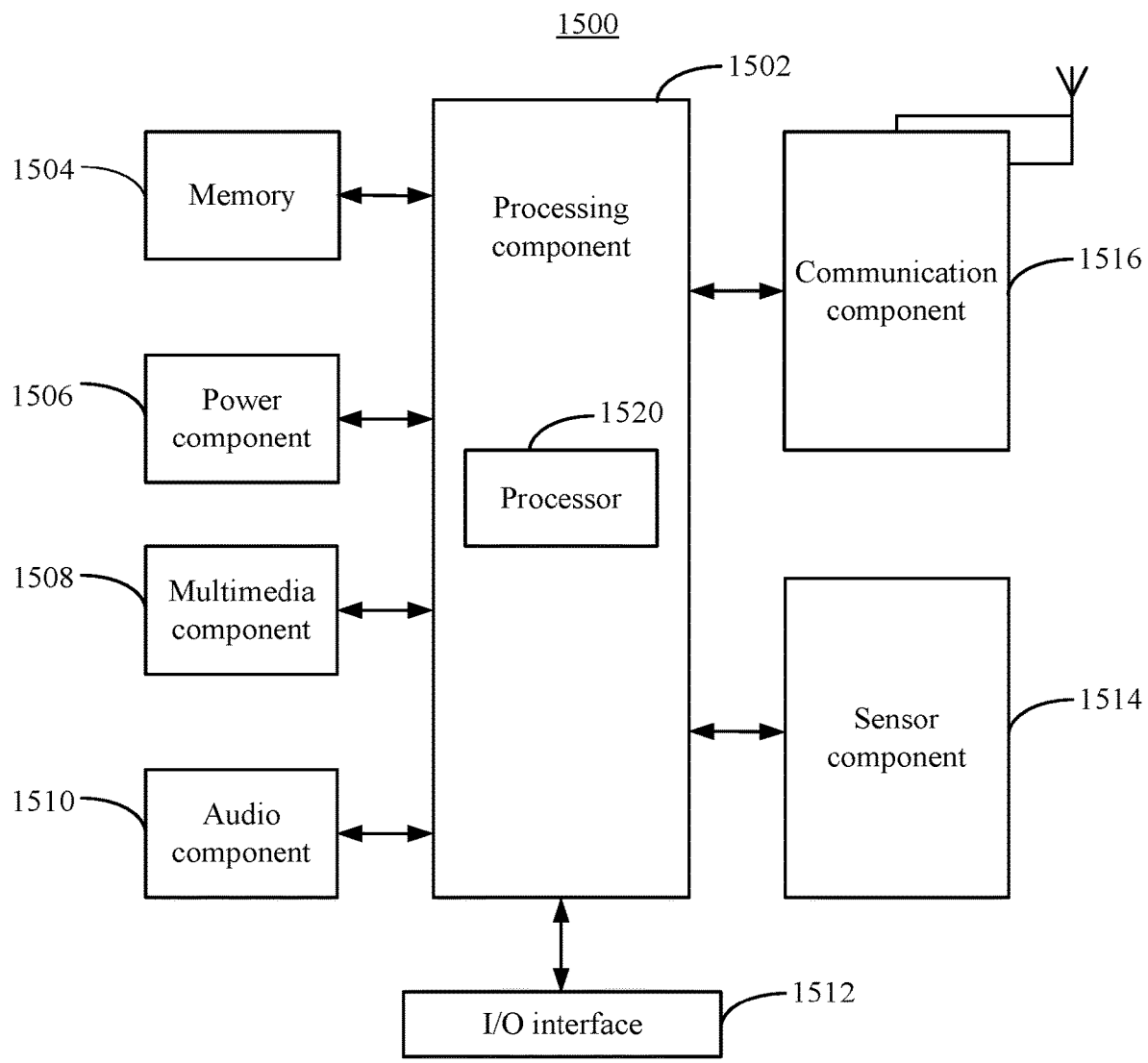
FIG. 15 is a block diagram showing a terminal device according to some embodiments.

FIG. 15 is a block diagram of a terminal device according to some embodiments. As shown in FIG. 15, the terminal device 1500 may include one or more of the following components: a processing component 1502, a memory 1504, a power component 1506, a multimedia component 1508, an audio component 1510, an input/output (I/O) interface 1512, a sensor component 1514, a communication component 1516 and an image acquisition component.

The processing component 1502 typically controls the overall operations of the terminal device 1500, such as the operations associated with display, telephone calls, data communications, camera operations, and recording operations. The processing component 1502 can include one or more processors 1520 to execute instructions to perform all or part of the steps in the above described methods. Moreover, the processing component 1502 can include one or more modules to facilitate the interaction between the processing component 1502 and other components. For example, the processing component 1502 can include a multimedia module to facilitate the interaction between the multimedia component 1508 and the processing component 1502.

The memory 1504 is configured to store various types of data to support the operation of the terminal device 1500. Examples of such data include instructions for any application or method operated on device 1500, such as the contact data, the phone book data, messages, pictures, videos, and the like. The memory 1504 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the terminal device 1500. The power component 1506 can include a power management system, one or more power sources, and other components associated with the generation, management, and distribution of power in the terminal device 1500.

The multimedia component 1508 includes a screen providing an output interface between the terminal device 1500 and the target object. In some embodiments, the screen can include a liquid crystal display (LCD) and a touch panel (TP). In some embodiments, an organic light-emitting diode (OLED) display or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. When the terminal device 1500 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1510 is configured to output and/or input an audio signal. For example, the audio component 1510 includes a microphone (MIC) configured to receive an external audio signal when the terminal device 1500 is in an operation mode, such as a call mode, a recording mode, and a voice recognition mode. The received audio signal may be further stored in the memory 1504 or sent via the communication component 1516. In some embodiments, the audio component 1510 also includes a speaker for outputting the audio signal.

The I/O interface 1512 provides an interface between the processing component 1502 and peripheral interface modules, such as a keyboard, a click wheel, buttons, and the like.

The sensor component 1514 includes one or more sensors for providing status assessments of various aspects of the terminal device 1500. For example, the sensor component 1514 can detect an open/closed status of the terminal device 1500, relative positioning of components, such as the display and the keypad of the terminal device 1500. The sensor component 1514 can also detect a change in position of one component of the terminal device 1500 or the terminal device 1500, the presence or absence of user contact with the terminal device 1500, an orientation, or an acceleration/deceleration of the terminal device 1500, and a change in temperature of the terminal device 1500. The sensor component 1514 can also include a light sensor arranged below the OLED display screen.

The communication component 1516 is configured to facilitate wired or wireless communication between the terminal device 1500 and other devices. The terminal device 1500 can access a wireless network based on a communication standard, such as Wi-Fi, 2G, 3G, 4G or 5G, or a combination thereof. In some embodiments, the communication component 1516 receives broadcast signals or broadcast associated information from an external broadcast management system via a broadcast channel In some embodiments, the communication component 1516 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the terminal device 1500 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

Various embodiments of the present disclosure can have one or more of the following advantages.

In a case where the total battery capacity is the same, the volume of each battery is reduced by the first battery and the second battery. In addition, the volume of the second battery is smaller than that of the first battery, so that the second battery can be installed in a relatively small space in the terminal device. In this way, on the premise of meeting the requirements of the terminal device for the battery power, the difficulty of installing the charging module is further reduced. Further, the charging of the second battery with small capacity can be suspended during the charging process by the control component and the switch device. Accordingly, the overcharging of the second battery is effectively avoided, and the safety of the charging system is ensured.

The various circuits, device components, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

It will be understood that the "plurality" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," and "the" are also intended to include the plural forms unless the context clearly indicates otherwise.

It will be further understood that although the terms such as "first," "second," and the like are used to describe various information, this information should not be limited by these terms. The terms are only used to distinguish the same type of information from each other, and do not indicate a specific order or importance. In fact, the expressions such as "first," "second" and the like can be used interchangeably. For instance, first information can also be referred to as second information without departing from the scope of the disclosure, and similarly, the second information can also be referred to as the first information.

It will be further understood that although the operations in the embodiments of the present disclosure are described in a specific order in the drawings, it will not be understood as requiring that the operations are performed in the specific order shown or in a serial order, or that perform all the operations shown to acquire the desired result. In certain environments, multitasking and parallel processing may be advantageous.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

It is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A charging method applied to the charging system, wherein the charging system comprises: a first battery; a second battery having a capacity smaller than that of the first battery; a switch device disposed outside the second battery and connected to the second battery; a charging component connected to the first battery and connected to the second battery via the switch device, wherein the charging component is configured to output a charging current to the first battery and the second battery; and a control component connected to the first battery and the second battery, wherein the control component is configured to detect remaining capacity of the first battery and the second battery during a charging process, and control the switch device to turn on or turn off based on the remaining capacity,
wherein the method comprises:
obtaining the remaining capacity of the first battery and the second battery during the charging process;
in response to the remaining capacity of the second battery increasing to a first preset threshold, controlling the switch device to disconnect the second battery from the charging component, and keeping the charging component charging the first battery; and
in response to the remaining capacity of the first battery increasing to a second preset threshold, controlling the switch device to connect the second battery with the charging component, and keeping the charging component charging the first battery.

2. The charging method according to claim 1, wherein the control component in the charging system comprises a first voltammeter and a second voltammeter; and the obtaining the remaining capacity of the first battery and the second battery comprises:
receiving a cell voltage and the charging current of the first battery obtained by the first voltammeter;
receiving a cell voltage and the charging current of the second battery obtained by the second voltammeter; and
determining the remaining capacity of the first battery based on the cell voltage and the charging current of the first battery, and determining the remaining capacity of the second battery based on the cell voltage and the charging current of the second battery.

3. The method according to claim 1, wherein the controlling the switch device to disconnect the second battery from the charging component comprises:
outputting a disconnection signal with a low level to the switch device, wherein a duration of a falling edge of the disconnection signal is greater than or equal to a first set duration; or
outputting a disconnection signal with a high level to the switch device, wherein a duration of a rising edge of the disconnection signal is greater than or equal to the first set duration.

4. The method according to claim 3, wherein in response to the remaining capacity of the second battery increasing to a first preset threshold, the first battery is kept being charged by:
obtaining the charging current of the first battery in response to the remaining capacity of the second battery increasing to the first preset threshold; and keeping the charging component charging the first battery with the charging current within the duration of the falling edge or the rising edge.

5. The method according to claim 1, wherein the controlling the switch device to connect the second battery with the charging component comprises:
outputting a connection signal with a high level to the switch device, wherein a duration of a rising edge of the connection signal is greater than or equal to a second set duration; or
outputting a connection signal with a low level to the switch device, wherein a duration of a falling edge of the connection signal is greater than or equal to the second set duration.

6. The method according to claim 5, wherein in response to the remaining capacity of the first battery increasing to a second preset threshold, the first battery is kept being charged by:
obtaining the charging current of the first battery in response to the remaining capacity of the first battery increasing to the second preset threshold;
keeping the charging component charging the first battery with the charging current within the duration of the rising edge or the falling edge.

7. The method according to claim 1, wherein before the remaining capacity of the first battery increases to the second preset threshold, the method further comprises:
determining total battery power based on the remaining capacity of the first battery and the first preset threshold in response to the remaining capacity of the second battery being greater than or equal to the first preset threshold; and
generating a remaining capacity prompt instruction based on the total battery power to control a terminal comprising the charging system to output remaining capacity prompt information.

8. A charging control apparatus applied to the charging system, wherein the charging system comprises: a first battery; a second battery having a capacity smaller than that of the first battery; a switch device disposed outside the second battery and connected to the second battery; a charging component connected to the first battery and connected to the second battery via the switch device, wherein the charging component is configured to output a charging current to the first battery and the second battery,
wherein the apparatus comprises a processor and a storage device for storing computer executable instructions that when executed by the processor cause the processor to:
obtain the remaining capacity of the first battery and the second battery during the charging process;
in response to the remaining capacity of the second battery increasing to a first preset threshold, control the switch device to disconnect the second battery from the charging component, and keep the charging component charging the first battery; and
in response to the remaining capacity of the first battery increasing to a second preset threshold, control the switch device to connect the second battery with the charging component, and keep the charging component charging the first battery.

9. The apparatus according to claim 8, wherein the processor is further configured to:
receive a cell voltage and the charging current of the first battery obtained by a first voltammeter;
receive a cell voltage and the charging current of the second battery obtained by a second voltammeter; and
determine the remaining capacity of the first battery based on the cell voltage and the charging current of the first battery, and determine the remaining capacity of the second battery based on the cell voltage and the charging current of the second battery.

10. The apparatus according to claim 8, wherein the processor is further configured to:
output a disconnection signal with a low level to the switch device, wherein a duration of a falling edge of the disconnection signal is greater than or equal to a first set duration; or
output a disconnection signal with a high level to the switch device, wherein a duration of a rising edge of the disconnection signal is greater than or equal to the first set duration.

11. The apparatus according to claim 10, wherein the processor is further configured to:
obtain the charging current of the first battery in response to the remaining capacity of the second battery increasing to the first preset threshold; and
keep the charging component charging the first battery with the charging current within the duration of the falling edge or the rising edge.

12. The apparatus according to claim 8, wherein the processor is further configured to:
output a connection signal with a high level to the switch device, wherein a duration of a rising edge of the connection signal is greater than or equal to a second set duration; or
output a connection signal with a low level to the switch device, wherein a duration of a falling edge of the connection signal is greater than or equal to the second set duration.

13. The apparatus according to claim 12, wherein the processor is further configured to:
obtain the charging current of the first battery in response to the remaining capacity of the first battery increasing to a second preset threshold; and
keep the charging component charging the first battery with the charging current within the duration of the rising edge or the falling edge.

14. The apparatus according to claim 8, wherein the processor is further configured to:
prior to the remaining capacity of the first battery increasing to the second preset threshold, determine total battery power based on the remaining capacity of the first battery and the first preset threshold in response to the remaining capacity of the second battery being greater than or equal to the first preset threshold; and
generate a remaining capacity prompt instruction based on the total battery power to control a terminal comprising the charging system to output remaining capacity prompt information.

15. A mobile terminal comprising a charging system, wherein the charging system comprises: a first battery; a second battery having a capacity smaller than that of the first battery; a switch device disposed outside the second battery and connected to the second battery; a charging component connected to the first battery and connected to the second battery via the switch device, wherein the charging component is configured to output a charging current to the first battery and the second battery; and a control component connected to the first battery and the second battery, wherein the control component is configured to detect remaining capacity of the first battery and the second battery during a charging process, and control the switch device to turn on or turn off based on the remaining capacity, wherein the mobile terminal is configured to:
suspend charging of the second battery during charging process by the control component and the switch device to thereby avoid overcharging of the second battery and improve safety of the charging system;
monitor the remaining capacity of the first battery and the second battery in real time, so as to determine the charging progress of the first battery and the second battery;
upon it is monitored that a remaining capacity of the second battery increases to a first preset threshold, control the switch device to disconnect the second battery from the charging component, the first battery with a large capacity is continued to be charged;
upon it is monitored that a remaining capacity of the first battery increases to a second preset threshold value, control the switch device to connect the second battery with the charging component again, and control the charging component to charge the first battery and the second battery simultaneously; and
upon the charging current of the first battery and the second battery reaches a cut-off current, complete the charging process.

16. A non-transitory readable storage medium having instructions stored therein for execution by a processing circuit to implement operations of the method according to claim 1.

\* \* \* \* \*